United States Patent [19]
Housel et al.

[11] Patent Number: 6,103,822
[45] Date of Patent: Aug. 15, 2000

[54] POLYMERIC ACID FUNCTIONAL POLYOLS, POLYURETHANES AND METHODS FOR MAKING SAME

[75] Inventors: Tyler Housel, Lansdale; Ira S. Katuran, Elkins Park, both of Pa.; Rocco Burgo, Cherry Hill, N.J.

[73] Assignee: Inolex Investment Corporation, Wilmington, Del.

[21] Appl. No.: 09/004,140

[22] Filed: Jan. 7, 1998

Related U.S. Application Data

[62] Division of application No. 08/689,939, Aug. 16, 1996, Pat. No. 5,880,250.

[51] Int. Cl.⁷ ...................................................... C08K 3/20
[52] U.S. Cl. ........................ 524/840; 524/591; 524/834; 528/272; 528/300; 528/307
[58] Field of Search ..................................... 528/272, 300, 528/307; 521/155, 170, 172; 524/591, 839, 840

[56] References Cited

U.S. PATENT DOCUMENTS

| | | |
|---|---|---|
| 3,620,987 | 11/1971 | McLaughlin et al. . |
| 3,644,234 | 2/1972 | Grieve . |
| 4,124,552 | 11/1978 | Koleske et al. . |
| 4,267,120 | 5/1981 | Cuscurida et al. . |
| 4,442,238 | 4/1984 | Zimmerman et al. . |
| 4,481,309 | 11/1984 | Straehle et al. . |
| 4,581,384 | 4/1986 | Marion . |
| 4,595,705 | 6/1986 | Werner et al. . |
| 4,753,967 | 6/1988 | Londrigan . |
| 4,758,607 | 7/1988 | Hallmark et al. . |
| 4,826,882 | 5/1989 | Bredbenner et al. . |
| 4,910,231 | 3/1990 | Pham et al. . |
| 4,916,168 | 4/1990 | Pham et al. . |
| 4,950,695 | 8/1990 | Stone . |
| 4,954,537 | 9/1990 | Sanns, Jr. . |
| 4,975,523 | 12/1990 | Altounian . |
| 5,013,766 | 5/1991 | Hanusa . |
| 5,043,360 | 8/1991 | Pham et al. . |
| 5,064,873 | 11/1991 | Snider et al. . |
| 5,066,713 | 11/1991 | Flakus . |
| 5,109,031 | 4/1992 | Snider . |
| 5,179,131 | 1/1993 | Wujcik et al. . |
| 5,332,860 | 7/1994 | Moore et al. . |
| 5,472,634 | 12/1995 | Hart ........................................ 252/193 |
| 5,489,618 | 2/1996 | Gerkin . |
| 5,494,960 | 2/1996 | Rolando et al. . |
| 5,508,340 | 4/1996 | Hart ........................................ 524/591 |

FOREIGN PATENT DOCUMENTS

| | | |
|---|---|---|
| 196 52 144 C1 | 1/1998 | Germany . |
| 46-028425 | 8/1971 | Japan . |
| 764091 | 12/1956 | United Kingdom . |
| 811296 | 4/1959 | United Kingdom . |
| 933713 | 8/1963 | United Kingdom . |
| 1108013 | 3/1968 | United Kingdom . |
| 1137263 | 12/1968 | United Kingdom . |
| 2 064 567 | 6/1981 | United Kingdom . |
| 2 119 393 | 11/1983 | United Kingdom . |

OTHER PUBLICATIONS

Communication and European Search Report, dated Jul. 15, 1999 in European counterpart Application No. 98124412.2–2115 (3 pages).

Inolex Chemical Company, "Insights", vol. 1, No. 2, "Applications for Acid Functional Polyester Polyols" (Jan., 1993).

*Primary Examiner*—John M. Cooney, Jr.
*Attorney, Agent, or Firm*—Akin, Gump, Strauss, Hauer & Feld, L.L.P.

[57] ABSTRACT

Polymeric acid functional polyols are provided which are the reaction product of at least one hydroxyl-terminated polymer and a nonaromatic polyanhydride. Polymeric acid functional polyols are also provided which are the esterification reaction product of a first component which is at least one of an aliphatic dicarboxylic acid, a polyol and mixtures thereof and a second component which has at least two unhindered functional groups and at least one hindered carboxylic acid functional group. Methods of making such polymeric acid functional polyols by reacting a hydroxyl-terminated polymer and a nonaromatic dianhydride or by the esterification reaction of the first and second component described herein are also included in the invention. Further, hydrophilic polyurethane foams and water borne polyurethanes formed from the reaction of these polymeric acid functional polyols with polyisocyanates are also provided.

10 Claims, 1 Drawing Sheet

POLYMERIC ACID FUNCTIONAL POLYOLS, POLYURETHANES AND METHODS FOR MAKING SAME

CROSS-REFERENCE TO RELATED APPLICATION

This is a division of application Ser. No. 08/689,939 filed Aug. 16, 1996 which is now U.S. Pat. No. 5,880,250. The entire disclosure of the prior application Ser. No. 08/689,939 as filed is herein incorporated by reference.

FIELD OF THE INVENTION

The present invention relates to the field of acid functional polyols useful for forming hydrophilic and water borne polyurethanes.

BACKGROUND OF THE INVENTION

Polyurethanes are typically manufactured as a reaction product of a polyisocyanate and a polyol. Other reactive compounds such as water, glycol, or diamines may be added to impart specific handling or mechanical properties. Polyurethane properties may also be modified with additives such as carboxylic acids, catalysts, solvents, surfactants, blowing agents, stabilizers, colorants, fillers, viscosity modifiers, release agents and plasticizers. The polyols generally used in manufacturing polyurethanes are low molecular weight polymers such as polyethers, polyesters, polycarbonates, polyacrylics, melamine and polybutadiene polyols. Such polyols are generally provided with at least two (end terminal) hydroxyl groups and may have a low level of residual acid functionality acquired by use of carboxylic acids during the manufacture of the polyols which incompletely react with diols to form the polyol. For example, in manufacturing polyester polyols, the reactant carboxylic acids may provide a residual acid value of less than 10 mg KOH/gram, with the majority of polyester polyols having acid values less than 1.5. Other polyols generally have an acid value less than 1.

There have been attempts to provide acid functionality to such polyols for use in forming water borne polyurethanes. One method to provide limited acid functionality to polyols includes use of carboxylic acid anhydrides. The anhydride group reacts readily with a hydroxyl group in the polyol to form a single molecule joined by an ester linkage and leaving a carboxylic acid group in the molecule. However, in many circumstances, the acid group can react with another hydroxyl group to yield a second ester which is an undesired side reaction.

One method of providing acid functionality, by incorporating carboxylic acid groups into the polymer backbone, includes use of dimethylolpropionic acid (DMPA). DMPA has a molecular weight of 136, two hydroxyl groups and one carboxylic acid group.

Generally, to form the polyurethane, the DMPA is reacted with the starting polyol and a diisocyanate to form an isocyanate-terminated prepolymer. The prepolymer is made at a temperature which allows the hydroxyl groups to react with excess isocyanate without consuming acid groups. The acid functional prepolymer becomes a water borne polyurethane dispersion by neutralizing the acid groups, dispersing in water and curing with a diamine. Difficulties which arise from use of DMPA are that it is a high melting solid material with limited solubility in polyols. As such DMPA is typically pre-dissolved in the polyol with solvent at temperatures over 100° C. Such a step adds processing time and cost to polyurethane manufacture and increases the need for organic solvents. In polyurethanes, the urethane linkages give strong hydrogen bonding and usually phase separate into what is known as a hard segment. However, when using DMPA, the final polyurethanes have an acid group within a few carbons of the urethane linkages which interferes with hard segment formation by inhibiting phase separation. As a result, mechanical properties of the polyurethane suffer.

In an attempt to improve upon the DMPA technology, products were developed which react the same starting polyols with trimellitic anhydride to provide an acid functional polyester polyol. Trimellitic anhydride has one anhydride group and lowers the average number of hydroxyl groups per molecule, or the hydroxyl functionality, significantly. The resulting polyurethanes have low molecular weight and produce coatings which are too soft and weak to be of commercial use. In addition, the coatings exhibit yellowing from ultraviolet rays upon exposure to sunlight.

A commercial improvement over DMPA is the use of LEXOREZ® 1405-65 for forming polyurethanes. LEXOREZ® 1405-65 is available from Inolex Chemical Company of Philadelphia, Pa. and is a polyester polyol which has a typical acid valve of 50, a typical hydroxyl number of 65 and a hydroxyl functionality less than 2. The polyol is formed from esterified polyols, polyacids and aromatic anhydrides. The resulting polyol, while better than DMPA in polyurethane formation, is not appropriate for many applications due to its low hydroxyl functionality which limits the ability to build the molecular weight of the polyurethane and makes it difficult to synthesize hard, strong polyurethane materials. As such, polyurethane coatings formed from this product are usually too soft. In addition, polyurethanes formed from LEXOREZ® 1405-65 tend to show a distinct yellowing from ultraviolet rays upon exposure to sunlight, sometimes as quickly as after only one day of exposure. The yellowing is suspected to arise as the result of a chromophore which is affected by sunlight exposure.

As such, there is a need in the art for a polyol which provides a polyurethane having good mechanical properties and sufficient phase separation for hard segment formation. Further, there is a need for a polyol which does not exhibit yellowing in the manner of prior art polyols upon exposure to ultraviolet rays.

Polyurethane properties can be greatly improved by forming ionomeric polyurethanes. Such ionomers can be formed from carboxylic acid functionalized polyols or polyurethanes by neutralizing the acid groups with a base.

By incorporating ionic groups in the urethane backbone, the polymer can be made more polar which can improve solvent resistance, and, depending upon the base used, can lead to either hydrophilic or hydrophobic properties. The ionic groups become sites for inter- and intramolecular attractions which increase the cohesive energy of the polymer. The bonds act in a manner similar to a covalent crosslinking but are capable of disassociation and reassociation subject to the application of stress, whereas a covalent bond would break under stress and cannot reform. Such ionomeric polyurethanes are particularly useful for forming hydrophilic polyurethane foams. Typical hydrophilic foams are known in the industry and are manufactured using polyols having a high percentage of alkylene oxide, such as ethylene oxide, with a low isocyanate index or with special hydrophilic additives. Typically, such foams become unprocessable at high levels of hydrophilicity, and are limited to moderate hydrophilic properties.

Ionomer polyurethane foams can be formed with higher levels of water than standard foams, and provide foams which are so hydrophilic they decompose quickly in water. By controlling and reducing the degree of hydrophilicity from this maximum, foams can be made hydrophilic with good wet strength. There is a need in the art for suitable hydrophilic polyurethane foams having improved hydrophilic properties and strength and for water borne polyurethanes for use in coatings, adhesives, sealants and the like which are formed from ionomeric polyurethanes, which exhibit good mechanical properties, and are easy and inexpensive to use in current polyurethane manufacturing processes. There is also a need in the art for a water borne polyurethane which is non-yellowing from ultraviolet rays upon exposure to sunlight.

SUMMARY OF THE INVENTION

The present invention solves the problems encountered in forming prior art polyols for forming polyurethanes as described above and includes polymeric polyols which contain not only reactive hydroxyl sites, but also reactive or neutralizable carboxylic acid sites which are distributed throughout the polymer backbone. The hydroxyl groups can be reacted with polyisocyanates to yield carboxylic acid functional polyurethanes in which the pendant carboxylic acid groups are compatible with water and do not interfere with hard segment formation. As such, the polyols are especially useful for forming water borne polyurethanes and hydrophilic polyurethane foams.

The present invention includes a non-yellowing acid functional polyol which is a reaction product of a polyol and a non-aromatic dianhydride. The acid functional polyol can be used for forming a hydrophilic or water borne polyurethane or a urethane-urea copolymer having excellent mechanical properties. In addition, the invention includes a non-yellowing acid functional polyol formed an esterification reaction of at least one aliphatic dicarboxylic acid and/or at least one polyol and a compound having two or more unhindered functional groups and one or more hindered carboxylic acid groups.

The present invention provides improved, non-yellowing polymeric acid functional polyols which may be used for forming hydrophilic polyurethane foams and for forming water borne polyurethanes. Polyurethanes formed from these polyols may be made non-yellowing by using aliphatic polyisocyanates in the urethane forming reaction and other non-yellowing components.

The present invention includes a polymeric acid functional polyol which is a reaction product of (i) at least one polymer, such as polyester polyols, polyether polyols, polyetherester polyols, polybutadiene polyols, polycarbonate polyols, polyacrylic polyols, or hydroxy-terminated polyolefins; and (ii) a nonaromatic polyanhydride. The polymeric acid functional polyol has an acid value of from 10 to about 150, a hydroxyl value of from about 20 to about 500 and a hydroxyl functionality of at least 2.

A method of making a polymeric acid functional polyol is also provided. In the method, at least one polymer, such as polyester polyols, polyether polyols, polyetherester polyols, polybutadiene polyols, polycarbonate polyols, polyacrylic polyols, or hydroxy-terminated polyolefins, is reacted with a nonaromatic polyanhydride at a temperature of from about 50° C. to about 200° C. to form an acid functional polyol. The reaction is terminated when the acid functional polyol has an acid value of from 10 to about 150, a hydroxyl value of from about 20 to about 500 and a hydroxyl functionality of at least 2.

The invention also includes a polymeric acid functional polyol which is an esterification reaction product of at least one first component and a second component. The first component is an aliphatic dicarboxylic acid and/or a polyol. The second component has at least two unhindered functional groups and at least one hindered carboxylic acid functional group. The polymeric acid functional polyol has an acid value of from about 10 to about 150, a hydroxyl value of from about 20 to about 500 and a hydroxyl functionality of at least 2.

A method of making a polymeric acid functional polyol based on the esterified products mentioned above is also provided. The method includes reacting at least one first component with a second component as described above in a one-shot esterification reaction at a temperature of from about 100° C. to about 250° C. to form an acid functional polyol. The reaction is terminated when the acid functional polyol has an acid value of from about 10 to about 150, a hydroxyl value of from about 20 to about 500 and a hydroxyl functionality of at least 2.

The invention also includes hydrophilic polyurethane foams formed from a polyisocyanate, water and a polymeric acid functional polyol. The polyol may be either of a acid functional polyol derived from a reaction of a polyol and a dianhydride, as described above, or a polymeric acid functional polyol which is an esterification reaction product of at least one first component and a second component, as described above.

Water borne polyurethanes are also included in the present invention. The water borne polyurethanes are a urethane reaction product of a polyisocyanate, and either of the polymeric acid functional polyols which can be used as reactants for forming the hydrophilic polyurethane foams of the present invention.

The present invention further includes a method of making a water borne ionomeric polyurethane and a method for making a hydrophilic polyurethane foam.

The method for making the water borne ionomeric polyurethane includes reacting a polyisocyanate with a polymeric acid functional polyol having an acid value of from 10 to about 150, a hydroxyl value of from about 20 to about 500 and a hydroxyl functionality of at least 2 to form an acid functional polyurethane having pendant carboxylic acid groups, and dispersing the acid functional polyurethane in water.

The method of making a hydrophilic polyurethane foam includes reacting a polyisocyanate with water and a polymeric acid functional polyol having an acid value of from 10 to about 150, a hydroxyl value of from about 20 to about 500 and a hydroxyl functionality of at least 2 to form an acid functional polyurethane having pendant carboxylic acid functional groups, and foaming the polyurethane.

BRIEF DESCRIPTION OF THE DRAWINGS

The following description of the preferred embodiments of the invention, will be better understood when read in conjunction with the appended drawings. For the purpose of illustrating the invention, there are shown in the drawings schematic representations of a prior art dispersed polyurethane and a dispersed polyurethane according to the present invention which are referred to in the detailed description and which aid in understanding the present invention. It should be understood, however, that the invention is not limited to the embodiment represented in the drawing. In the drawings.

DETAILED DESCRIPTION OF PREFERRED EMBODIMENTS

Figure 1:
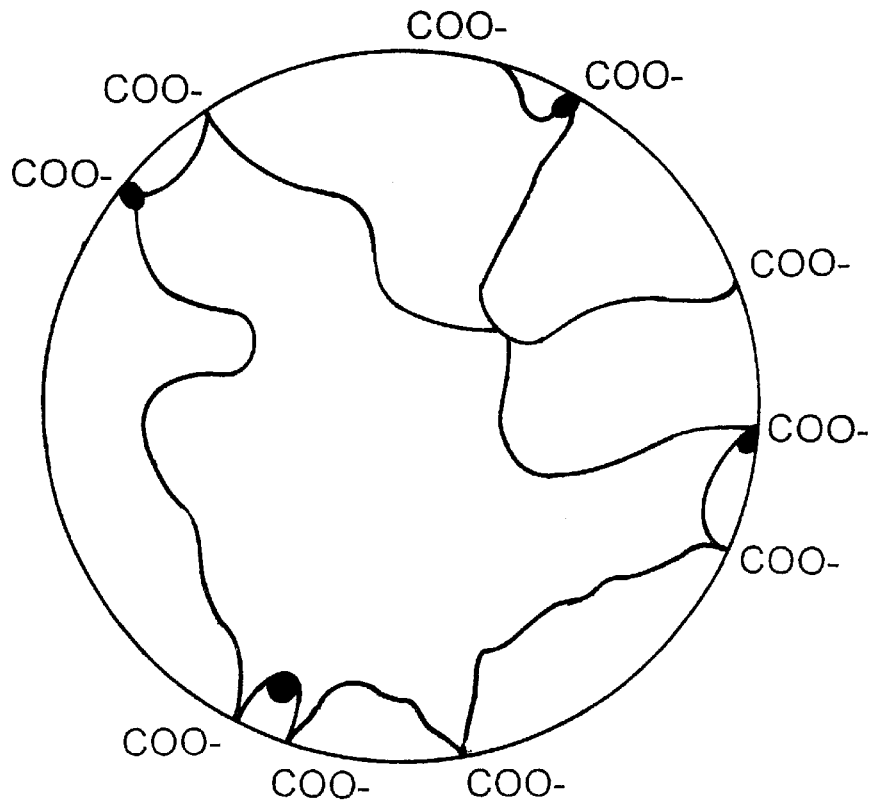
FIG. 1 is a schematic representation of a dispersed water borne polyurethane particle formed by a hydroxyl functionalized polyol modified by use of DMPA in accordance with a prior art method of forming a water borne polyurethane with the dark areas representing the urethane/urea hard segments and the white areas representing the soft segment.

The present invention is directed to polymeric acid functional polyols which are useful for forming both water borne polyurethanes and hydrophilic polyurethane foams. As used herein the terms "polyol," "polyanhydride" and "polyisocyanate" refer, respectively, to compounds having two or more —OH functional groups, two or more anhydride groups, and two or more isocyanate groups.

In addition as used herein "acid value" or "acid number" of the acid functional polyol is determined by weighing a small sample, typically 2–10 g, of the acid functional polyol into a flask. A 1:1 mixture of ethanol and benzene is added to dissolve the polyol. If the resin does not readily dissolve, a small amount of acetone may be added. The solution is titrated with a standardized KOH and measured in units of mg KOH/g sample.

The "hydroxyl value," or "hydroxyl number" of a given polymeric polyol is defined by the following formula:

$$\text{Hydroxyl Number} = \frac{56{,}100}{\text{Equivalent Weight}} \qquad \text{(I)}$$

where the Equivalent Weight is the hydroxyl equivalent weight.

Acid functional polyols according to the present invention having the preferred hydroxyl functionality and acid and hydroxyl values can be derived from a reaction of either (1) a nonaromatic polyanhydride with at least one polymer as described below; or (2) at least one polyol and/or dicarboxylic acid with a component having at least two unhindered functional groups and at least one hindered carboxylic acid functional group. The resulting polymeric acid functional polyols have acid functional groups situated such that when reacted with a polyisocyanate, they provide acid functional groups to the resulting polyurethane which are distributed throughout the soft segment of the polyurethane and are not primarily situated near the hard segment. The hydrophilic foams formed from the novel acid functional polyols exhibit excellent hydrophilicity and strength. In addition, acid functional polyols formed from the nonaromatic polyanhydrides are non-yellowing. As a result, water borne polyurethanes formed from such polyols can also be made non-yellowing, and exhibit excellent strength and related mechanical properties.

The polymeric acid functional polyols formed by the present invention include not only reactive hydroxyl groups, but also reactive or neutralizable pendant carboxylic acid groups situated throughout the backbone of the polymeric polyol which then forms the soft segment of a polyurethane formed from the polyol. The hydroxyl groups in the polymeric acid functional polyol react with isocyanate groups of the polyisocyanates to produce carboxylic acid functional polyurethanes. Such polyurethanes are manufactured as the reaction product of a polyisocyanate, the acid functional polyol and optionally other reactive compounds such as water, glycols or diamines as described in detail below.

According to one preferred embodiment of the present invention, polymeric acid functional polyols are formed by the reaction of a polymer, preferably a polymeric polyol, with a nonaromatic polyanhydride. The polymer reactant has a hydroxyl functionality of at least 2, preferably from 2–4 and need not have any acid functionality. The hydroxyl value of the reactant polymer is preferably from about 30 to about 1,000, preferably from about 50 to about 250. The backbone of the polymer reactant may include hydrogen, ester or ether bonds, or combinations of such bonds, and the polymer is preferably hydroxy-terminated. Exemplary polymers include a polyester polyol, a polyether polyol, a polyetherester polyol, a polybutadiene polyol, a polycarbonate polyol, a polyacrylic polyol, a hydroxy-terminated polyolefin or similar hydroxy-terminated polymer. In addition, one or more of these polymers may be used in a mixture. Most preferably, the polymer used is a polyester polyol. Suitable polyester polyols having the preferred hydroxyl number and a functionality of at least two include LEXOREZ® 1640-150 (hydroxyl number of 150; hydroxyl functionality of 2.0), LEXOREZ® 1400-120 (hydroxyl number of 120 and hydroxyl functionality of 2.0) and other LEXOREZ® polyesters available from Inolex Chemical Company of Philadelphia, Pa.

Preferred polymeric polyols may be formed by the reaction of a diol and/or a polyol and a dicarboxylic acid. The diols and/or polyols useful for forming the polymeric polyol used in the reaction described above, may be any suitable aliphatic, aromatic, mixed or ether-containing polyol. Preferably, the diol and/or polyol used is ethylene glycol, propanediol, butanediol, homo- or copolymers of polyethylene glycol and/or polypropylene glycol, hexanediol, neopentyl glycol and similar compounds.

While any suitable dicarboxylic acid, or its anhydride or derivatives, may be used, the preferred dicarboxylic acids for forming, for example, polyester or polyetherester polyols, include adipic acid, citric acid, maleic acid, phthalic acid, isophthalic acid, terephthalic acid, trimellitic acid, succinic acid, and their anhydrides and derivatives. Once the polymeric polyol is formed, it can then be reacted as described below with a nonaromatic polyanhydride.

The polyanhydrides may be any molecule that contains two or more nonaromatic anhydride groups. Applicants have discovered that use of nonaromatic polyanhydrides contributes to forming a polymeric acid functional polyol which is non-yellowing upon exposure to sunlight and which has pendant carboxylic acid functional groups. Examples of suitable polyanhydrides include cyclopentanedianhydride, 5-(2,5-dioxotetrahydrol)-3-methyl-3-cyclohexene-1,2 dianhydride, ethylenediaminetetraacetic dianhydride, 4-(2, 5-dioxotetrahydrofuran-3-yl)tetraline-1,2-dicarboxylic anhydride and similar compounds. The preferred polyanhydrides for use with polyester polyols include cyclopentanedianhydride and 5-(2,5-dioxotetrahydrol)-3-methyl-3-cyclohexene-1,2 dianhydride. However, it should be understood, based on this disclosure, that other nonaromatic dianhydrides capable of reacting with hydroxyl groups to form an ester linkage and leaving a pendant carboxylic acid group on a polymeric polyol backbone are within the scope of this invention.

The hydroxyl groups in the polymeric polyol react with the anhydride groups in the polyanhydride to form an ester linkages and to provide a pendant carboxylic acid group on the polymer backbone. The molecular weight builds by the reaction of the end groups of the polyol which are not converted to acid groups. If only a monoanhydride is used, as in prior art acid functional polyols, a carboxylic acid group forms on the end of the molecular chain. As such, the group interferes with the formation of the hard segment of a polyurethane, inhibiting the ability to build molecular weight, and creating a polymer that is not particularly useful. Further, aromatic anhydrides cause yellowing upon exposure to sunlight.

The di- or polyanhydrides react with the hydroxyl groups and link two polyol chains together. The carboxylic acid functional groups that are left are separated from the reactive hydroxyl groups by the length of the polymer chain. An example of the basic reaction mechanism with a typical nonaromatic cyclic dianhydride is shown below for a polyester polyol:

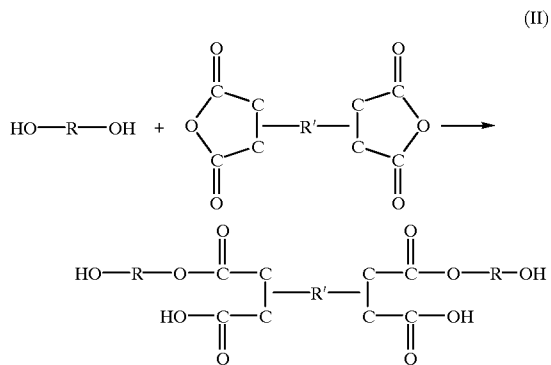

wherein R represents any branched or straight chain monomeric or polymeric organic group suitable for use as a backbone for the hydroxy-functionalized polyol of the present invention as described above. Preferably R is a polymeric chain, such as a polyester, as described above. R' in formula (II) is a nonaromatic aliphatic or cycloaliphatic group linking one or both non-carbonyl carbons on each of the two anhydride groups of the dianhydride and includes direct bonds between the non-carbonyl carbons on the different anhydrides. While reaction (II) is exemplified above with a preferred cycloaliphatic dianhydride structure, it should be understood, based on this disclosure, that other non-cyclic nonaromatic dianhydrides can be used to form the polymeric acid functional polyols according to the invention and would undergo a similar reaction. As shown in reaction (II), the polyol reacts with the dianhydride to form an acid functionalized polyol in which there are reactive hydroxyl groups, and neutralizable or reactive carboxylic acid groups.

If the temperature is high enough, or certain types of catalysts are used, the carboxylic acid functional groups pendant from the polymeric acid functional polyol chain may be made to react with other hydroxyl groups, but this is an undesired side reaction which should be avoided by carefully monitoring the reaction.

The reaction should take place under conditions that will react the anhydride groups with the hydroxyl terminal groups of the polymeric polyol, but without also reacting a significant amount of the pendant acid groups created from that reaction with other hydroxyl functional groups. Depending on the nature and hindrance of both the hydroxyl groups on the polyol and the nature and hindrance of the anhydride groups on the polyanhydride, the reaction temperature will typically range from about 50° C. to about 200° C. for periods of time of from about 10 minutes to about 24 hours. Minor amounts of catalysts, such as organometallic catalysts, for example, organotin catalysts, may be added to control the reaction. If the reaction, through use of certain catalysts or a temperature which is too low, occurs too slowly, conversion to an acid functional polyol will take too long. However, if, as a result of the use of particular catalysts or a temperature which is too high, the reaction proceeds too quickly, unwanted side reactions, as discussed above, could occur.

The polymer reactant and the polyanhydride should be present with a slight excess of hydroxyl groups. The particular amounts used are dependent upon the desired functionalities of the acid functionalized polyol to be made. The amount of dianhydride needed may be calculated from the acid equivalent weight of the dianhydride which corresponds to the acid equivalent weight of the desired acid value of the acid functional polyol. For example if an acid value of 56 in the acid functional polyol is desired, then the acid equivalent weight of the acid functional polyol is approximately 1000 g for 1 acid equivalent. If the dianhydride has an equivalent weight of 100 g for 1 acid equivalent, than 100 g of dianhydride are used. The amount of starting polyol is provided in an amount sufficient to provide the remaining weight to be combined with the anhydride to achieve the desired acid equivalent weight for the acid functional polyol. Continuing the same example, 900 g of starting polyol would be reacted with 100 g of dianhydride to achieve the 1,000 g necessary for 1 acid equivalent.

Once the amount of reactants is determined, the hydroxyl value of the acid functional polyol can be estimated by substracting the amount of hydroxyl units required for forming the necessary acid units (i.e., the desired acid value), from the starting amount of hydroxyl units for the given amount of reactant polyol. Continuing the above example, if the starting polyol has a hydroxyl value of 150, and 900 g of starting polyol are used to form 1,000 g of acid functional polyol, the starting hydroxyl units are 150×0.9= 135. To achieve an acid value of 56, 56 hydroxyl units must be used. That amount is substracted from 135 and the estimated hydroxyl value of the acid functional polyol should be about 79.

Because the acid and hydroxyl values are dependent upon weight and the weight will increase when additional reactants are added, the calculations should be adjusted to correct for the additional weight and to provide an additional amount of acid to achieve the final acid functionality.

Preferably, based on the above described relationships, and as a result of any such calculations, the percentage ratios of polymer reactant to polyanhydride in the reaction product should be from about 30:1 to about 1:1, and preferably from about 20:1 to about 5:1.

The resulting polymeric acid functional polyol will have an average molecular weight typically of from about 500 to about 10,000 and which is generally higher is than the starting polymer reacted with the polyanhydride. Further, each anhydride group in the starting charge will preferably yield at least one pendant carboxylic acid group in the acid functional polyol. The hydroxyl functionality of the finished polyol is generally greater than or equal to the hydroxyl functionality of the starting polymer reactant. The resulting polymeric acid functional polyol has an acid value of at least 10. Preferably, the acid value is from 10 to about 150, and more preferably, from about 20 to about 75. The hydroxyl value of the polymeric acid functional polyol is at least about 20, preferably from about 20 to about 500, and, more preferably, from about 50 to about 150. The hydroxyl functionality is at least 2, and preferably from 2 to 4.

In one preferred method for making a polymeric acid functional polyol in accordance with this invention, at least one polymer including the hydroxy-terminated polyolefins and polymeric polyols noted above is reacted with a non-aromatic polyanhydride as described above at a temperature of from about 50° C. to about 200° C. to form an acid functional polyol. The reaction is monitored by taking samples periodically and measuring both the acid and hydroxyl numbers. The reaction is terminated when the acid functional polyol has an acid value of at least 10, preferably from 10 to about 150, a hydroxyl value of at least about 20, preferably from about 20 to about 500, and a hydroxyl functionality of at least 2. More preferably, the reaction is terminated when the acid value is from about 20 to about 75, the hydroxyl value is from about 50 to about 150 and the hydroxyl functionality is from 2 to 4.

In accordance with another preferred embodiment, polymeric acid functional polyols of the present invention may be derived from an esterification reaction of at least one first component which may be an aliphatic polycarboxylic acid, preferably a diacid, or a polyol or mixtures of such diacids and polyols with a second component which has at least two unhindered functional groups and at least one hindered carboxylic acid functional group. The unhindered functional groups may be a carboxylic acid group, a hydroxyl group, a primary or secondary amine group, a thiol group, or another similar group capable of reacting with a carboxylic acid. Preferably, the unhindered functional groups are carboxylic acid or hydroxyl groups.

The resulting polymeric acid functional polyols have an acid value of at least about 10, preferably from about 30 to about 150, and more preferably from about 30 to about 75. The hydroxyl value of the acid functional polyol is at least about 20, preferably from about 20 to about 500, and more preferably from about 35 to about 150. The hydroxyl functionality is at least 2, and preferably from 2 to 4.

The first component, which includes one or more polyols and/or one or more aliphatic diacids, is chosen in conjunction with the second component in order to facilitate the desired reaction and to achieve the preferred functionalities in the acid functional polyol. For example, if the second component selected has reactive (unhindered) carboxylic acid functional groups, then the first component should be at least one monomeric or polymeric polyol. Such components are reacted under conditions which allow the unhindered carboxylic acid groups on the second component to react with the hydroxyl groups on the polyol(s) and leave the hindered carboxylic acid group unreacted. In the final polymer, the hindered groups are distributed along and are pendant from the polymer backbone.

As a further example, if the second component selected has reactive (unhindered) groups which are hydroxyl groups and/or some other group(s) capable of reacting with carboxylic acid, such as primary or secondary amine or thiol groups, then the first component is selected to have one or more polyol(s) and to have a reactive diacid to covalently bond the molecule containing the hindered carboxylic acid group to the polyol to form the acid functional polyol which will have distributed pendant carboxylic acid groups.

Aliphatic diacids which may be used in the esterification reaction include oxalic acid, malonic acid, succinic acid, glutaric acid, adipic acid, maleic acid, fumaric acid, azeleic acid, phthalic acid, isophthalic acid, terephthalic acid, their anhydrides and derivatives, and other similar diacids and dimers having the requisite diacid functionality.

The polyols useful in the esterification reaction may be monomeric or polymeric. Exemplary polymeric polyols include polyester polyols, polyether polyols, polyacrylic polyols, polybutadiene polyols, polycarbonate polyols, homopolymers or copolymers of polyethylene and polypropylene glycol, and other similar polymeric polyols. Exemplary monomeric polyols include ethylene glycol, 1,2-propanediol, 1,3-propanediol, glycerin, butanediol, hexanediol, neopentyl glycol, trimethylol propane and similar monomeric polyol compounds. It will be understood, based on this disclosure, that other diacids and polyols can be used within the scope of this invention as long as they are capable of reacting with the unhindered groups of the second component and not reacting to any significant extent with the hindered carboxylic acid group(s) of the second component.

Examples of compounds which may be used as the second component and which have one hindered carboxylic acid group and two unhindered functional groups include tricarballylic acid (1,2,3-propanetricarboxylic acid), citric acid, gluconic acid, glutamic acid (alpha-amino-glutaric acid), glyceric acid, dimethylolpropionic acid, cysteine (alpha-amino-beta-thiolpropionic acid), glutamine (2-amino-4-carbamoylbutanoic acid) and similar compounds having the necessary number of hindered and unhindered groups.

It is preferred that the components be combined by reacting them in a range of weight percentage ratios of from about 30:1 to about 1:1, preferably from about 20:1 to about 4:1 of the first component to the second component. The ratio of the reactants may have to be adjusted depending upon the particular components selected to form the acid functional polyol.

In a preferred reaction according to the present invention, the first component includes adipic acid and a polyethylene glycol having an average molecular weight of from about 100 to about 2,000. The first component further may also include glycerin and/or trimethylol propane. The second component is preferably either dimethylolpropionic acid, citric acid or a mixture of these two acids. More preferably, the second component is citric acid.

In such a reaction, the acid functional polyol would be the reaction product of from about 10 to about 50 wt % of adipic acid, from about 20 to about 85 wt % of polyethylene glycol, optionally from about 0 to about 10 wt %, preferably 0.1 to 10 wt % of glycerin and/or trimethylol propane, and from about 2 to about 25 wt % of the second component.

In forming an acid functional polyol according to the preferred method of the present invention, at least one first component is reacted with the second component, as described above. The reaction is preferably a one-shot esterification reaction at a temperature of from about 100° C. to about 250° C. to form an acid functional polyol. The reaction is monitored by taking samples periodically and measuring both the acid and hydroxyl numbers. The reaction is terminated when the acid functional polyol has an acid value of at least about 10, preferably from about 30 to about 150, and more preferably from about 30 to about 100, a hydroxyl value of at least about 20, preferably from about 20 to about 500, more preferably from about 35 to about 150, and a hydroxyl functionality of at least 2, preferably from 2 to 4.

Non-yellowing water borne polyurethanes and hydrophilic polyurethane foams according to the present invention may be formed from the polymeric acid functional polyols mentioned above. As used herein, and for the purposes of this description, the "polyurethanes" formed according to the present invention include traditional polyurethane polymers and polyurethane-polyurea copolymers. However, the reaction will be described primarily with respect to the preferred polyurethane polymers. It should be understood, based on this disclosure, however, that "polyurethane" as used herein includes both polyurethanes in general and polyurethanepolyurea copolymers.

The water borne polyurethanes are formed as a urethane reaction product of a polyisocyanate and a polymeric acid functional polyol. A neutralizing base may also be provided to the reaction. The polymeric acid functional polyol should have an acid value of at least 10, preferably from 10 to about 150, more preferably from about 20 to about 100, and most preferably from about 30 to about 75, a hydroxyl value of at least about 20, preferably from about 20 to about 500, and more preferably from about 50 to about 150, and a hydroxyl functionality of at least 2, preferably from 2 to 4. The polymeric acid functional polyol may be formed either (1) as the polyol reaction product of at least one polymer and a nonaromatic polyanhydride, as described above; or (2) as an esterification reaction product of a first component including a dicarboxylic acid and/or a polyol and a second component which has at least two unhindered functional groups and at least one hindered carboxylic acid functional group as described above.

Preferably, the polyisocyanate is provided to the reaction in a sufficient amount such that the equivalent ratio of isocyanate to total available reactive hydrogen (the isocyanate index) including, for example, the reactive hydrogen from water, amine or hydroxyl, is from about 0.2 to about 2.0. Any neutralizing base used should be added in a sufficient amount of from about 0.5 to about 2.0 times the amount of neutralizable acid groups in the poylurethane.

The polyisocyanate may be any polyisocyanate useful for forming a polyurethane. Useful polyisocyanates include aliphatic, cycloaliphatic, araliphatic, aromatic polyisocyanates and combinations of these compounds which have two or more isocyanate (NCO) groups per molecule as well as their derivatives. The polyisocyanates may be organic, modified organic, organic polyisocyanate-terminated prepolymers, and mixtures thereof. Exemplary polyisocyanates include substituted and unsubstituted polyisocyanates and isomeric mixtures, including tetramethylene diisocyanate, hexamethylene diisocyanate (HDI), dodecane diisocyanate, octamethylene diisocyanate, decamethylene diisocyanates, cyclobutane-1,3-diisocyanate, 1,2-, 1,3- and 1,4-cyclohexane diisocyanates, 2,4- and 2,6-methylcyclohexane diisocyanates, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis (isocyanatomethyl)-cyclohexane diisocyanates, 4,4'- and 2,4'-bis(isocyanatomethyl) dicyclohexane, isophorone diisocyanate, 2,4- and 2,6-hexahydrotoluenediisocyanate, 1,2, 1,3, and 1,4-phenylene diisocyanates, triphenyl methane-4,4', 4"-triisocyanate, naphthylene-1,5-diisocyanate, 2,4- and 2,6-toluene diisocyanate (TDI), 2,4'-, 4,4'- and 2,2-biphenyl diisocyanates, 2,2'-, 2,4'- and 4,4'-diphenylmethane diisocyanates (MDI), polyphenyl polymethylene polyisocyanates (PMDI), mixtures of MDI and PMDI, mixtures of PMDI and TDI, aromatic aliphatic isocyanates such as 1,2-, 1,3- and 1,4-xylylene diisocyanates and m-tetramethylxylyene diisocyanate (TMXDI), and modified polyisocyanates derived from the above-isocyanates and polyisocyanates.

Preferred polyisocyanates useful in the present invention include TDI, MDI, PMDI and related mixtures of these compounds for use in forming hydrophilic polyurethane foams, and isocyanatomethylcyclohexane isocyanates, isocyanatoethylcyclohexane isocyanates, bis (isocyanatomethyl)-cyclohexane diisocyanates, 4,4'- and 2,4'-bis(isocyanatomethyl) dicyclohexane for use in forming non-yellowing polyurethanes. The aliphatic polyisocyanates are preferred for reaction with non-yellowing polymeric acid functional polyols for forming non-yellowing acid functional polyurethanes. However, it should be understood from this disclosure, that any of the above-listed, or similar, polyisocyanates are suitable for use in the present invention.

The neutralizing base, which may be added to the water borne polyurethane reaction, functions to neutralize the carboxylic acid groups of the acid functional polyurethane. The base may be added either during polymerization of the polyurethane, as a separate neutralization step on the already polymerized acid functional polyurethane, or during dispersion of the polyurethane in an aqueous medium. The base may be added at any of these stages, or, if the stages occur simultaneously, the base is present throughout all stages. The base may be either an alkali hydroxide, such as sodium hydroxide, potassium hydroxide, calcium hydroxide or similar compounds, or an amine. The amines are preferably hindered organic amines such as triethylamine, triethylene diamine, dimethyl cetylamine and similar compounds. While primary or secondary amines could be used, they are not preferred unless the neutralization step takes place after the urethane polymer is formed, because the amine hydrogen will readily react with the isocyanate groups thereby interfering with the polyurethane polymerization.

The base forms ionic groups on the polyurethane backbone which make the polyurethane more polar, can provide improved solvent resistance, and can lead to hydrophilicity or hydrophobicity, depending upon the base selected.

In addition to the polyisocyanate, base and polymeric acid functional polyol and optional base as reactants, in forming a water borne polyurethane according to the invention, other compounds such as additional and different polyols, polyamines, preferably diamines, water and mixtures of these compounds may also be used as urethane reactants to impart specific handling or mechanical properties.

Suitable additional reactant polyols include any of those polyols described above which are useful as reactants for forming the polymeric acid functional polyols formed from dianhydride or esterification reactions, and including both polymeric and monomeric polyols. Such polyols may be added to the polymerization reaction mixture, for water borne polyurethanes, in amounts of from about 0 to about 90 wt %, preferably from about 0 to about 75 wt %, of the reaction mixture. In foam forming reactions, as described below, such polyols should be provided in amounts of from about 0 to about 90 wt %, preferably from about 0 to about 75 wt %, of the reaction mixture.

Exemplary polyamines include those which may function as chain extenders, property modifiers or crosslinkers for either the dispersed water borne polyurethanes or the polyurethane foams such as primary or secondary polyamines in which the radicals attached to the nitrogen atoms can be saturated or unsaturated, aliphatic, alicyclic, aromatic, or heterocyclic, including, for example, 1,2-ethylenediamine, 1,2-propylenediamine, hydrazine, hexamethylene diamine, 2-methyl penta-methylene diamine, isophorone diamine, propane 2,2-cyclohexylamine, methane-bis-(4-cyclohexylamine), o-phenylene diamine, p-toluene diamine, and derivatives of these compounds. Such polyamines should be added to either water borne or hydrophilic foam reaction mixtures in amounts of from about 0 wt % to about 20 wt %, more preferably from about 0 wt % to about 10 wt %, of the reaction mixture.

In addition to the urethane reactants, the properties of the resulting polyurethanes may be modified by using various additives. The additives should preferably be provided in an amount no greater than 90 wt % of the reaction mixture. Exemplary additives include catalysts; solvents; surfactants; blowing agents for foams, including water or volatile hydrocarbons or halogenated hydrocarbons; stabilizers; colorants including pigments and dyes; fillers; viscosity modifiers; release agents; plasticizers; processing aids; antioxidants; compatibility agents; flame retardants; dispersing agents; and UV absorbers, for example, for light stabilization in non-yellowing water borne polyurethanes.

Typical catalysts include reactive and unreactive tertiary amines, such as triethylenediamine, n-methyl morpholine, n-ethyl morpholine, diethylethanol amine, n-coco morpholine, 1-methyl-4-dimethylaminoethyl piperazine, 3-methoxy-n-dimethylpropylamine, n,n-diethyl-3-diethyl aminopropylamine, dimethylbenzyl amine, bis(n,n-dimethylaminoethyl)ether and 1,4-diazabicyclo[2.2.2] octane, dimethylcyclohexylamine, and dimethylethanolamine; and organo-metallic catalysts or metal salt catalysts such as stannous octoate, dibutyltindilaurate, dimethyltindilaurate, dibutyltindialkylmercaptide, and potassium octoate. Catalysts are generally added in an amount of from about 0 to about 30,000 ppm to the reaction mixture.

Surfactants useful for polyurethanes include both hydrolyzable and non-hydrolyzable polysiloxane-polyoxyalkylene block copolymers, cyanoalkylpolysiloxanes, and polydimethylsiloxane oils. Surfactants are provided to the reaction mixture generally in amounts of from about 0 to about 5 wt % of the mixture.

Hydrophilic polyurethane foams according to the present invention are formed from the reaction of a polyisocyanate, water and a polymeric acid functional polyol. The polymeric acid functional polyol should have an acid value of at least 10, preferably from 10 to about 150, more preferably from about 10 to about 100, and most preferably from about 15 to about 75, a hydroxyl value of at least about 20, preferably from about 20 to about 500, and more preferably from about 50 to about 150, and a hydroxyl functionality of at least 2, preferably from about 2 to 4. The polymeric acid functional polyol may be formed either (1) as the reaction product of at least one polymer and a nonaromatic polyanhydride, as described above; or (2) as the esterification reaction product of a first component including a dicarboxylic acid and/or a polyol and a second component which has at least two unhindered functional groups and at least one hindered carboxylic acid functional group as described above.

Preferably, the polyisocyanate, which may be any of the polyisocyanates useful for forming the non-yellowing water borne polyurethane as described above, is provided to the foam reaction in an amount sufficient such that the isocyanate index, as described above, is from about 0.1 to about 2.0 and preferably about 0.2 to about 1.3. Water should be added in a range of ratios of from about 1 part water to about 100 parts water per 100 parts total polyol (including both the acid functional and non-acid functional polyols), preferably from about 2 to about 50 parts water per 100 parts total polyol. The foam reaction may also include different polyols, polyamines, a neutralizing agent, and other additives, such as blowing agents and the like, as described above in connection with the water borne polyurethanes.

The method of making a water borne ionomeric polyurethane according to the present invention includes reacting a polyisocyanate, such as those described above, with a polymeric acid functional polyol having an acid value of at least 10, preferably from 10 to about 150, a hydroxyl value of at least about 20, more preferably from about 20 to about 500, and a hydroxyl functionality of at least 2 to form an acid functional polyurethane having pendant carboxylic acid groups. If the polyurethane is to be non-yellowing, the polyisocyanate is preferably aliphatic. Further, if further reactants such as polyamines or different polyols or additives such as those described above are provided to the reaction mixture, then the reactants and additives should be selected to maximize the sunlight color stability of the final polyurethane. As the polymeric acid functional polyol and polyisocyanate provide non-yellowing polyurethanes, the additives and additional reactants should be selected so as not to interfere with the non-yellowing character of the base polymer. As such, materials should be selected which do not promote sunlight discoloration and which are sufficiently stable in sunlight. Further, ultraviolet stabilizers can be provided to increase the sunlight stability and color fastness of the polyurethanes.

The water borne polyurethanes, which may be made non-yellowing, are useful in forming adhesives, sealants, elastomers, coatings and in other similar polyurethane applications. Further, the polyurethanes may be formed by either a one-shot or staged reaction as described below.

The polymeric acid functional polyol may be made in accordance with either the hydroxyl functional polyol and dianhydride reaction or the reaction of the first and second components as described above. The polyurethane is dispersed in water and the pendant carboxylic acid groups may be neutralized with a base, as described above. These steps may occur in the order described, i.e., a staged reaction, or may all be undertaken simultaneously, i.e., a one-shot reaction. The polyurethanes may be cured via use of curatives, initiation (using UV light or an electron beam), increasing temperature, addition of catalysts, solvent evaporation, or any techniques used by those skilled in the art.

The water borne polyurethane can be formed using water, diamine or a polyol as a chain extender. The polyurethane reaction using a low molecular weight polyol chain extender proceeds in accordance with formula (III) below:

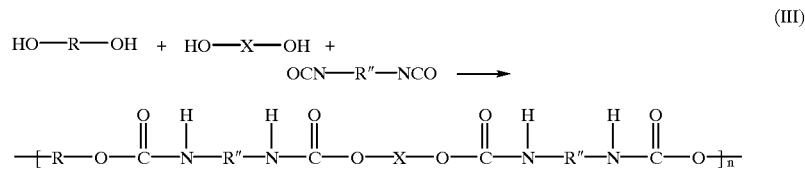

(III)

wherein R represents the acid functional polyol chain which forms the soft segment of the resulting polyurethane, X is the organic basis of the polyol chain extender, R" is the organic group which forms the basis of the polysocyanate and n is from about 10 to about 1000 to provide a polyurethane having an average molecular weight generally ranging from about 20,000 to about 2,000,000. All of the repeating chain above, with the exception of R, forms the hard segment of the polyurethane.

It is preferred that the polyisocyanate and acid functional polyol are initially reacted, preferably using a catalyst as described above, to form a isocyanate-terminated prepolymer. The prepolymer is then dispersed in water and a chain extender, such as one of the polyamines described above, is provided to extend the prepolymer to form the polyurethane dispersion. When using the prepolymer method, polyamines are preferred as chain extenders as they are more reactive than polyols in the presence of water. The reaction involves first reacting the acid functional polyol and with the isocyanate to form an isocyanate-terminated prepolymer. The amine groups of the chain extender are then reacted with the isocyanate groups of the prepolymer as shown below in formula (IV). The pendant carboxylic acid groups of the polyol, which forms the soft segment of the polyurethane, are neutralized with a base. The basic reaction using a polyamine chain extender proceeds as shown below:

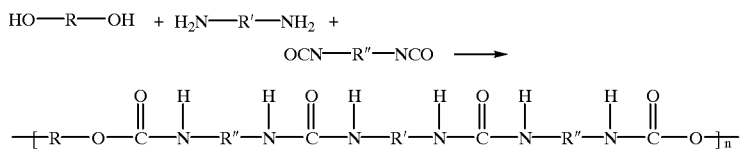

(IV)

where R is as described above, R' is the organic group which forms the basis for the polyamine, and R" and n are as described above. All of the repeating chain shown in formula (IV) in the resulting polyurethane, with the exception of R, forms the hard segment of the polyurethane. Alternatively, the reaction could be initially partially chain extended with a polyol in the prepolymer phase and then further chain extended with polyamine in the aqueous phase when dispersed in water.

In the method for forming hydrophilic polyurethane foam, according to the present invention, the polyisocyanate, as described above, is reacted with water and a polymeric acid functional polyol having an acid value of at least 10, preferably from 10 to about 150, more preferably from about 10 to about 100, and most preferably from about 15 to about 75, a hydroxyl value of at least about 20, preferably from about 20 to about 500, and more preferably from about 50 to about 150, and a hydroxyl functionality of at least 2, preferably from 2 to 4, to form an acid functional polyurethane having pendant carboxylic acid groups. The acid functional groups may be neutralized with a base, as described above, to form a polyurethane ionomer or left unneutralized.

The polyurethane or polyurethane ionomer is foamed, and, either after formation of the ionomer, or preferably simultaneously with formation of the ionomer, produces a hydrophilic foam. Generally, the polyurethane formation, foaming and any neutralization step all occur simultaneously in a one-shot foaming process. While blowing agents may be provided to the reaction mixture to foam the polyurethanes, it is preferred that water serve both as a reactant in the polyurethane reaction and as a blowing agent for the foam. In the foam reaction, water reacts with an isocyanate groups of the polyisocyanate to form carbamic acid which is an unstable intermediate that proceeds to form an amine and carbon dioxide. The amine reacts with an isocyanate group on the polyisocyanate to form the polyurethane (polyurea) hard segment as shown below:

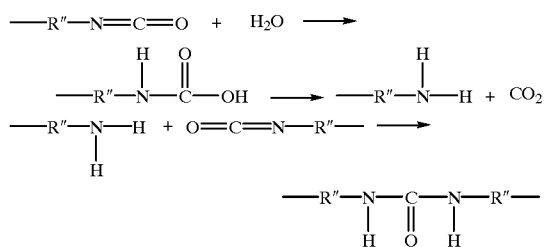

wherein R" is the base of the polyisocyanate. Chain extenders such as polyamines and polyols may be provided, however, water or polyols are preferred chain extenders for the foam reaction, more preferably, water functions as the chain extender. An example of the polyurethane foam reaction, using water as a chain extender proceeds as follows:

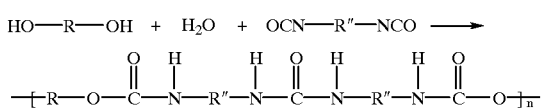

wherein R represents the polymeric acid functional polyol chain and R" and n are also as described above.

The foaming of the polyurethanes is typically a one-shot process where all reactants are mixed with any number of the additional reactants and additives mentioned above with respect to the water borne polyurethanes and the blend quickly generates foam and begins to cure. The water and neutralizing base can be added as separate streams to the reaction or combined ahead of time and provided simultaneously. The base may be any of those described above. Further, in forming a hydrophilic polyurethane foam, the primary urethane reactants may also be further reacted to modify the properties by providing a neutralizing base, an additional and different polyol, a polyamine or a mixture of these components as described above.

In foaming, flexible foams may be made by any suitable foaming process including spraying, pouring, injecting, molding, and any other similar foaming process.

The polyurethanes formed by the present invention can be further processed into final articles by spray, roll, brush, dip, electrostatic, injection, extrusion, expansion/compression, melt and other similar techniques used in polyurethane manufacturing.

As shown in FIG. 1, the prior art technique of imparting acid functionality to a polyol by incorporating DMPA into a hydroxyl functional polyol provides polyurethanes in which the acid functional groups (designated as COO—) are within the hard segments (designated as black zones). The acid functional groups, when dispersed and polarized in water are drawn to the periphery of the particle along with the adjacent hard segments. The interior of the particle is primarily formed of the interwoven soft segments of the polyurethane (designated by the wavy lines). This structure results in inferior mechanical properties, and poor dispersibility in water due to the low acid functionality and the placement of the acid functional groups which interfere with phase separation.

Figure 2:
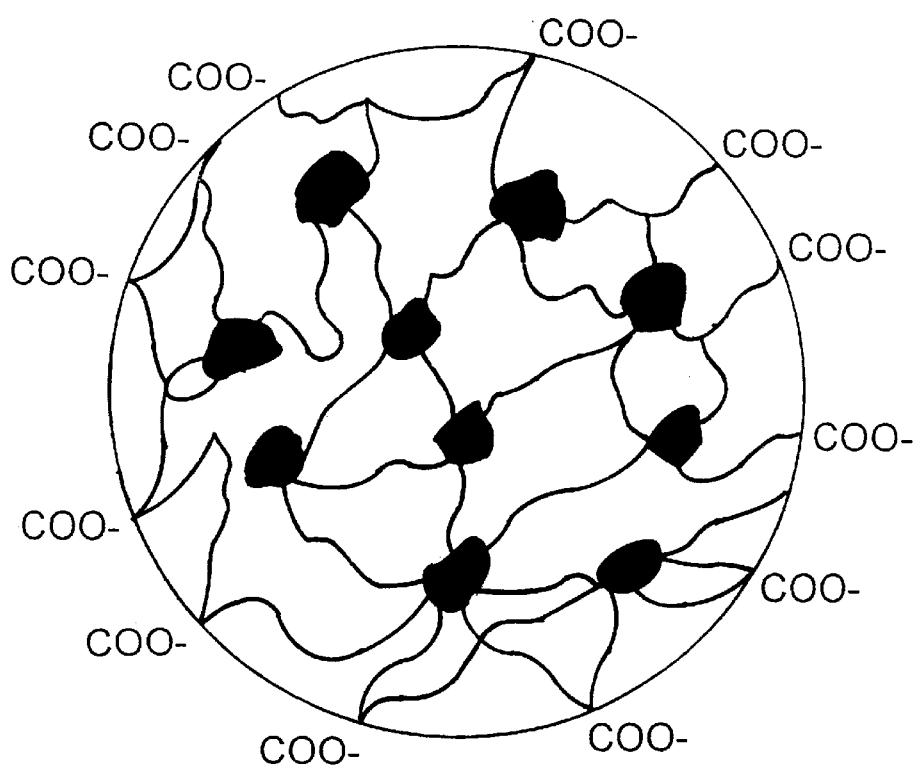
FIG. 2 is a schematic representation of a dispersed water borne polyurethane particle according to the present invention as formed by a polymeric acid functional polyol according to the present invention with the dark areas representing the urethane/urea hard segments and the white areas representing the polyol rich soft segment.

As can be seen from FIG. 2, by forming polyurethanes, such as water borne polyurethanes, using the polymeric acid functional polyols of the present invention, the acid functional groups are located on the soft segment polymer backbone and not within the hard segment. As a result, the acid functional groups are separated from the hard segment during phase separation. When the ionomeric polyurethanes are dispersed in water, the acid functional groups are located around the periphery of a given dispersed polyurethane particle and polarized by the water. The hard segments are well dispersed throughout the polyurethane particle, because they are not adjacent to the acid functional groups, thereby providing excellent strength properties and dispersibility. Similar results are achieved when forming hydrophilic polyurethane foams.

The invention, with respect to the polymeric acid functional polyols, polyurethanes and methods for making the acid functional polyols and polyurethanes will now be described in more detail with respect to the following specific, non-limiting examples:

EXAMPLE 1

An acid functional polyol was formed by charging a reaction vessel with 4033 g of a polyester polyol having a hydroxyl value of 120 mg KOH/g, an acid value less than 1, a hydroxyl functionality of 2.0 and an average molecular weight of about 900 (LEXOREZ® 1400-120). The vessel was heated with a temperature varying between 100 and 110° C. and 550 g of 5-(2,5-dioxotetrahydrol)-3-methyl-3-cyclohexene-1,2 dianhydride were added. The vessel temperature was maintained until the resultant product was free of visible haze and particulates. The final polyol had an acid value of 52, a hydroxyl value of 55 and a hydroxyl functionality of 2. The resulting polyol had properties virtually identical to the theoretically predicted acid value of 51 which would occur if all of the anhydride groups were converted to ester groups yielding pendant carboxylic acid in the polyol. The product was essentially linear.

EXAMPLE 2

An acid functional polyol was made using the same procedure as described in Example 1 but using 850 g of a polyester polyol having a hydroxyl value of 150, an acid value of no greater than 1, a hydroxyl functionality of 2.0 and an average molecular weight of 750 (LEXOREZ® 1640-150) and 60 g of 5-(2,5-dioxotetrahydrol)-3-methyl-3-cyclohexene-1,2 dianhydride. The resulting acid functional polyol had an acid value of 30.3, a hydroxyl value of 119.1, a hydroxyl functionality of 2 and a Brookfield viscosity of 434 cps at 60° C.

EXAMPLE 3

A non-yellowing waterborne polyurethane was formed from an isocyanate-terminated prepolymer formed by the acid functional polyol of Example 2. The isocyanate-terminated prepolymer was formed by reacting 25.9 g of LEXOREZ® 1400-120 with 202.2 g of the acid functional polyol formed in Example 2, 18.8 g of butanediol and 173.2 g of bis(4-isocyanato cyclohexyl) methane in a solution with 103.6 g of n-methyl pyrrolidone. The prepolymer reaction was conducted at 60° C. for 4 hours and yielded a prepolymer having a viscosity of 64,300 cps at 26.4° C. and an NCO content of 4.71% at 78.7% solids. The prepolymer was dispersed in water, in an amount of 132 g, and chain extended to form a waterborne polyurethane in one step with 5.6 g of triethylene diamine, 10 g of a 35% solution of hydrazine, and 168 ml of water at room temperature over a period of time of 5 minutes. The final dispersion had a viscosity of 752 cps at 25.8° C. with a solids content of 34.3%.

EXAMPLE 4

A non-yellowing waterborne polyurethane was formed using the acid functional polyol of Example 2. An acid functional isocyanate-terminated prepolymer was formed by reacting 10 g of butanediol, 250 g of the acid functional polyol of Example 2, 175 g of bis(4-isocyanato cyclohexyl) methane in a solution with 100 g of n-methyl pyrrolidone. The prepolymer reaction was conducted as described in Example 3 and yielded a final prepolymer with a low viscosity and an NCO content of 4.37%. The prepolymer, in an amount of 128 g, was dispersed in water and chain extended to form the waterborne polyurethane in one step with 4 g of triethylene diamine, 10 g of a 35% aqueous solution of hydrazine and 190 ml of water. The final dispersion had a viscosity of 58.4 cps at 21.0° C. with a solids content of 31.5%.

EXAMPLE 5

An acid functional polyol was made in accordance with the procedure of Example 1 using 850 g of LEXOREZ® 1400-120 and 60 g of 5-(2,5-dioxotetrahydrol)-3-methyl-3-cyclohexene-1,2 dianhydride. The resulting polyol had an acid value of 30.6, a hydroxyl value of 80.8, a hydroxyl functionality of 2 and a Brookfield viscosity of 850 cps at 60° C.

EXAMPLE 6

An acid functional polyol was made in accordance with the procedure of Example 1 using 1104 g of a polyester polyol having a hydroxyl value of 190, an acid value of no greater than 1, a hydroxyl functionality of 2.0 and an average molecular weight of 600 (LEXOREZ® 1140-190) and 96 g of 5-(2,5-dioxotetrahydrol)-3-methyl-3-cyclohexene-1,2 dianhydride. The resulting polyol had an acid value of 39.4, a hydroxyl value of 146.5, a hydroxyl functionality of 2 and a Brookfield viscosity of 1195 cps at 60° C.

EXAMPLE 7

An acid functional polyol was made in accordance with the procedure of Example 1 using 1104 g of a polyester polyol having a hydroxyl value of 220, an acid value of no greater than 1, a hydroxyl functionality of 2.0 and an average molecular weight of about 500 (LEXOREZ® 1100-220LG) and 96 g of 5-(2,5-dioxotetra-hydrol)-3-methyl-3-cyclohexene-1,2 dianhydride. The resulting polyol had an acid value of 45.6, a hydroxyl value of 185.3, a hydroxyl functionality of 2 and a Brookfield viscosity of 183 cps at 60° C.

EXAMPLE 8

An acid functional polyol was made in accordance with the procedure of Example 1 using 1588 g of LEXOREZ®

1400-120 and 149 g of cyclopentane dianhydride. The resulting polyol had an acid value of 44, a hydroxyl value of 88, a hydroxyl functionality of 2 and a Brookfield viscosity of 2800 cps at 60° C.

EXAMPLE 9

An acid functional polyol was formed by charging a reaction vessel with 1520 g (10.4 moles) of adipic acid, 287 g (1.5 moles) of citric acid and 2744 g (14.1 moles) of tetra(ethylene glycol). The reaction continued at 185° C. until the acid value reached 22 mg KOH/g. The finished polyol was removed then from the reaction vessel and cooled to room temperature for packaging. It had a hydroxyl value of 70 mg KOH/g, a hydroxyl functionality of at least 2 and a Brookfield viscosity of 12100 cps at 250° C.

EXAMPLE 10

An acid functional polyol was made in accordance with the procedure of Example 9 using 1356 g (9.3 moles) adipic acid, 478 g (2.5 moles) of citric acid and 2671 g (13.7 moles) of tetra(ethylene glycol). The reaction was terminated to yield an acid functional polyol having an acid value of 27, a hydroxyl value of 73, a hydroxyl functionality of at least 2 and a Brookfield viscosity of 48500 at 25° C.

EXAMPLE 11

A hydrophilic polyurethane foam was formed in a bench scale reaction using the acid functional polyol formed in Example 9. The acid functional polyol in an amount of 100 g was weighed in a plastic cup. The polyol was neutralized with 45.65 g of 0.45N aqueous NaOH and combined with a standard additive package consisting of 1.2 g of organosilicone surfactant and 1.85 g of a blend of tertiary amine catalysts. The reactants were mixed slowly to homogeneity with minimal air incorporation, and 48.65 g of toluene diisocyanate (TDI) were quickly added. The formulation was then mixed at 2500 rpm for 6–8 seconds. The resulting froth was poured in a box for foaming. The foam was cured overnight before handling and testing. This technique is commonly used to simulate the results of production scale foams in the laboratory. The resulting foam was weak but had a uniform cell structure. It was very hydrophilic and degraded quickly in water.

EXAMPLE 12

A hydrophilic polyurethane foam was formed in a bench scale reaction in accordance with the procedure of Example 11 using 100 g of the acid functional polyol formed in Example 9, 41.6 g of 0.5 N NaOH, the same catalysts and surfactants, and 48.65 g of TDI. The resulting foam was similar to that of Example 11.

EXAMPLE 13

A hydrophilic polyurethane foam was formed in a bench scale reaction in accordance with the procedure of Example 11 using 95 g of the acid functional polyol of Example 9, 5 g of a polyester polyol having an acid value of no greater than 2, a hydroxyl value of 50, a hydroxyl functionality of 2.7 and an average molecular weight of 3,000 (LEXOREZ® 1102-50A), 45.65 g of 0.45 N NaOH, the same catalysts and surfactants, and 20.52 g of TDI. The resulting foam was similar to that of Example 11.

EXAMPLE 14

An acid functional polyol was formed in accordance with the procedure of Example 9 using 827 g (5.6 moles) of adipic acid, 117 g (0.9 moles) of dimethylolpropionic acid, 333 g (2.8 moles) of hexanediol and 323 g (2.8 moles) of neopentyl glycol. The resulting polyol had an acid value of 35, a hydroxyl value of 62, a hydroxyl functionality of at least 2 and a Brookfield viscosity of 27,100 cps at 25° C.

EXAMPLE 15

A hydrophilic polyurethane foam was made in accordance with the procedure of Example 11 using 100 g of acid functional polyol from Example 9, 20.8 g of 0.5 N NaOH, the same catalysts and surfactants, and 48.65 g of TDI. The resulting foam was slightly stronger than that of Example 11 and still degradable in water.

EXAMPLE 16

A hydrophilic polyurethane foam was made in accordance with Example 11 using 100 g of the acid functional polyol of Example 9, 15.0 g of 0.5 N NaOH, the same catalysts and surfactants, and 49.79 g of TDI. The resulting foam was slightly stronger than that of Example 11 and degraded more slowly in water.

EXAMPLE 17

A hydrophilic polyurethane foam was made in accordance with Example 11 using the 100 g of the acid functional polyol of Example 9, 10.0 g of 0.5 N NaOH, the same catalysts and surfactants and 49.79 g of TDI. The resulting foam was stronger than that of Example 11. The foam was highly absorbent, but did not degrade in water.

EXAMPLES 18–35

The following Examples were made by the procedure of Example 11 using 100 g of the acid functional polyol of Example 10, the same catalysts and surfactants and 48.65 g of TDI. The varied amounts of NaOH are shown in Table 1 below along with the experimental results including the wet out time, which represents the time for the foam to completely absorb 3 ml of water, and the total water added to the formulation. The foams were evaluated after curing. Shrinkage and splitting indicate instability in the foam as it reacted its maximum volume. Splitting results from insufficient strength to hold the foam together. Shrinkage results from foam which is too strong and, as blowing pressure increases, the bubbles are incapable of popping causing the foam to shrink. Shrinkage generally indicates insufficient water absorbency. The following Examples 18–35 demonstrate the effect of the amount of water and base on the particular foam composition.

TABLE 1

| Example No. | NaOH (g) | Total Water (g) | Wet Out Time (min:sec) | Foam Structure |
|---|---|---|---|---|
| 18 | 0.32 | 4.7 | 6:53 | slight shrinkage |
| 19 | 0.32 | 9.7 | 0:36 | good |
| 20 | 0.32 | 14.7 | 0:07 | coarse |
| 21 | 0.32 | 19.7 | 0:19 | good |
| 22 | 0.32 | 29.7 | 0:25 | splits |
| 23 | 0.32 | 39.7 | 0:17 | splits |
| 24 | 0.64 | 4.4 | 5:49 | shrinkage |
| 25 | 0.64 | 9.4 | 0:05 | slight shrinkage |
| 26 | 0.64 | 14.4 | 0:18 | good |
| 27 | 0.64 | 19.4 | 0:11 | good |
| 28 | 0.64 | 29.4 | 0:04 | good |
| 29 | 0.64 | 39.4 | 0:02 | good |

TABLE 1-continued

| Example No. | NaOH (g) | Total Water (g) | Wet Out Time (min:sec) | Foam Structure |
|---|---|---|---|---|
| 30 | 0.96 | 4.0 | 3:03 | shrinkage |
| 31 | 0.96 | 9.0 | 0:15 | slight shrinkage |
| 32 | 0.96 | 14.0 | 0:13 | good |
| 33 | 0.96 | 19.0 | 0:05 | good |
| 34 | 0.96 | 29.0 | 0:06 | good |
| 35 | 0.96 | 39.0 | 0:06 | splits |

EXAMPLES 36–44

The following Examples were made in accordance with the procedure of Example 11. All use the standard additive package and 48.65 g of TDI. Each Example also used 100 g of total polyol which included a blend of the acid functional polyol formed in Example 10 and LEXOREZ® 1102–50A in amounts as shown in Table 2 below. Examples 27–29 are as described above in Table 1. When a foam splits to a high degree, it collapses completely. As shown in Table 2, stable foams may be formed using the acid fucntional polyol under conditions for which such foam cannot be formed with a standard polyol. At high amounts of water, higher amounts, preferably approaching 100% of the acid functional polyol are required. As the amount of water is lowered, standard polyols may be blended with the acid functional polyol. However, such foams require at least some addition of the acid functional polyol. It can be seen that the present invention allows formation of foams under conditions and adding water in amounts previously thought to be unattainable.

TABLE 2

| Example No. | AFP (g) | LEXOREZ® 1102-50A (g) | NaOH (g) | Total Water (g) | Wet Out Time (min:sec) |
|---|---|---|---|---|---|
| 27 | 100 | 0 | 0.64 | 19.4 | 0:11 |
| 36 | 75 | 25 | 0.48 | 19.5 | 0:15 |
| 37 | 50 | 50 | 0.33 | 19.7 | 0:42 |
| 38 | 25 | 75 | 0.18 | 19.8 | collapse |
| 28 | 100 | 0 | 0.64 | 29.4 | 0:04 |
| 39 | 75 | 25 | 0.48 | 29.5 | 0:17 |
| 40 | 50 | 50 | 0.33 | 29.7 | collapse |
| 41 | 25 | 75 | 0.18 | 29.8 | collapse |
| 29 | 100 | 0 | 0.64 | 39.4 | 0:02 |
| 42 | 75 | 25 | 0.48 | 39.5 | collapse |
| 43 | 50 | 50 | 0.33 | 39.7 | collapse |
| 44 | 25 | 75 | 0.18 | 39.8 | collapse |

EXAMPLE 45

An acid functional polyol was made in accordance with the procedure of Example 9 using 2019 g (13.8 moles) of adipic acid, 366 g (1.9 moles) of citric acid and 1866 g (17.6 moles) of diethylene glycol. The resulting polyol had an acid value of 21, a hydroxyl value of 47, a hydroxyl functionality of at least 2 and a Brookfield viscosity of 6200 cps at 60° C.

EXAMPLE 46

An acid functional polyol was made in accordance with the procedure of Example 9 using 1272 g (8.7 moles) of adipic acid, 566 g (2.9 moles) of citric acid, 1027 g (9.7 moles) of diethylene glycol and 1531 g (3.8 moles) of polyethylene glycol having a molecular weight of 400. The resulting polyol had an acid value of 21, a hydroxyl value of 80, a hydroxyl functionality of at least 2 and a Brookfield viscosity of 11,700 cps at 25° C.

EXAMPLE 47

A hydrophilic polyurethane was made in accordance with the procedure of Example 11 using 100 g of the acid functional polyol formed in Example 46, 10.5 g of an aqueous solution of 5 NaOH, an additive package consisting of 1.0 g of organosilicon surfactant and 0.5 g of tertiary amine catalysts, and 50.0 g of TDI. The resulting foam had an open cellular structure and good strength. The foam was very hydrophilic and achieved a wet out time of only 1 second.

Based on the foregoing experimental Examples, it can be seen that the acid functional polyols produce excellent non-yellowing water borne polyurethanes and hydrophilic polyurethane foams. The polyurethanes foams exhibit good strength and excellent hydrophilicity. The water borne polyurethanes did not yellow upon exposure to sunlight and exhibited good mechanical properties.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A water borne polyurethane which is a urethane reaction product of a polyisocyanate, a neutralizing base and a polymeric acid functional polyol which is a polyol reaction product of (i) at least one polymer selected from the group consisting of polyester polyols, polyether polyols, polyetherester polyols, polybutadiene polyols, polycarbonate polyols, polyacrylic polyols, and hydroxy-terminated polyolefins; and (ii) a nonaromatic polyanhydride, wherein the polymeric acid functional polyol has an acid value of from 10 to about 150, a hydroxyl value of from about 20 to about 500 and a hydroxyl functionality of at least 2.

2. The polyurethane according to claim 1, wherein the polyisocyanate is aliphatic and the polyurethane is non-yellowing.

3. The polyurethane according to claim 1, wherein the polyurethane is further the urethane reaction product of a reactant selected from the group consisting of a polyol different from the at least one polymer, a polyamine, and mixtures thereof.

4. A water borne polyurethane which is a urethane reaction product of a polyisocyanate and a polymeric acid functional polyol which is an esterification reaction product of (i) at least one first component selected from the group consisting of an aliphatic dicarboxylic acid, and a polyol; and (ii) a second component having at least two unhindered functional groups and at least one hindered carboxylic acid functional group, wherein the polymeric acid functional polyol has an acid value of from about 10 to about 150, a hydroxyl value of from about 20 to about 500 and a hydroxyl functionality of at least 2, and wherein the first component is capable of reacting with at least two of the unhindered functional groups of the second component during esterification and the acid functional polyol has pendant carboxylic acid groups distributed along a backbone of the acid functional polyol, the pendant carboxylic acid groups being derived from the hindered carboxylic acid groups of the second component.

5. The polyurethane according to claim 4, wherein the polyisocyanate is aliphatic and the polyurethane is non-yellowing.

6. The polyurethane according to claim 4, wherein the polyurethane is further the urethane reaction product of a reactant selected from the group consisting of a polyol different from the at least one first component, a polyamine, and mixtures thereof.

7. A method of making a water borne ionomeric polyurethane, comprising the steps of:
   (a) reacting a polyisocyanate with a polymeric acid functional polyol having an acid value of from 10 to about 150, a hydroxyl value of from about 20 to about 500 and a hydroxyl functionality of at least 2 and having pendant carboxylic acid groups distributed along a backbone of the polymeric acid functional polyol to form an acid functional polyurethane having pendant carboxylic acid groups; and
   (b) dispersing the polyurethane in water.

8. The method according to claim 7, further comprising the step of neutralizing the pendant carboxylic acid groups with a base.

9. The method according to claim 7, wherein the polyisocyanate is aliphatic and the polyurethane is non-yellowing.

10. The method according to claim 7, further comprising the steps of reacting the polyisocyanate and the acid functional polyol to form a prepolymer, dispersing the prepolymer in water, and chain extending the prepolymer to form the water borne polyurethane.

* * * * *